United States Patent [19]

Miller

[11] 3,943,361

[45] Mar. 9, 1976

[54] DIMENSIONAL MEASUREMENT OF REMOTE OBJECTS USING PROJECTED LIGHT RASTER

[75] Inventor: Carl T. Miller, Tigard, Oreg.

[73] Assignee: Oregon Graduate Center for Study and Research, Beaverton, Oreg.

[22] Filed: Aug. 7, 1974

[21] Appl. No.: 495,326

[52] U.S. Cl. .................. 250/236; 250/560; 350/7
[51] Int. Cl.² ............................................. H01J 3/14
[58] Field of Search ........... 250/560, 561, 234, 235, 250/236; 350/7, 285; 178/7.6; 356/156, 159, 160, 167

[56] References Cited

UNITED STATES PATENTS

| | | | |
|---|---|---|---|
| 3,488,102 | 1/1970 | Buck et al. .............................. 350/7 |
| 3,523,160 | 8/1970 | Willey ................................. 178/7.6 |
| 3,541,247 | 11/1970 | Moi ..................................... 350/285 |
| 3,619,626 | 11/1971 | Rudolph ............................ 250/561 |
| 3,658,428 | 4/1972 | Voigtlaender-Tetzner ......... 250/560 |
| 3,749,500 | 7/1973 | Carlson et al. ....................... 356/156 |
| 3,791,607 | 2/1974 | Klang et al. .......................... 250/560 |
| 3,802,774 | 4/1974 | Eschler et al. ....................... 250/560 |
| 3,853,406 | 12/1974 | Zanoni ................................. 356/167 |

FOREIGN PATENTS OR APPLICATIONS 1,041,127  9/1966  United Kingdom................ 250/560

*Primary Examiner*—Eli Lieberman
*Assistant Examiner*—D. C. Nelms
*Attorney, Agent, or Firm*—Kolisch, Hartwell, Dickinson & Stuart

[57] ABSTRACT

A system for measuring a lineal dimension of a light reflective object. Sequentially generated light markers forming a raster are projected toward the object to be measured, with the markers traveling along individual, parallel paths which are uniformly spaced-apart along the dimension being measured. Markers intercepted and reflected back by the object are photoelectrically detected and counted to determine the size of the object along the measured dimension.

7 Claims, 8 Drawing Figures

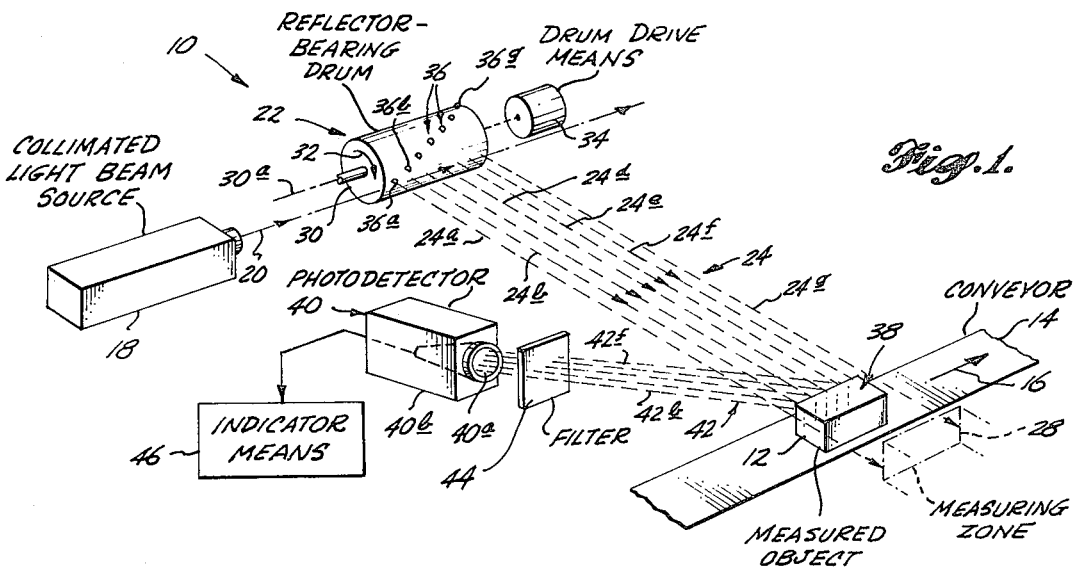
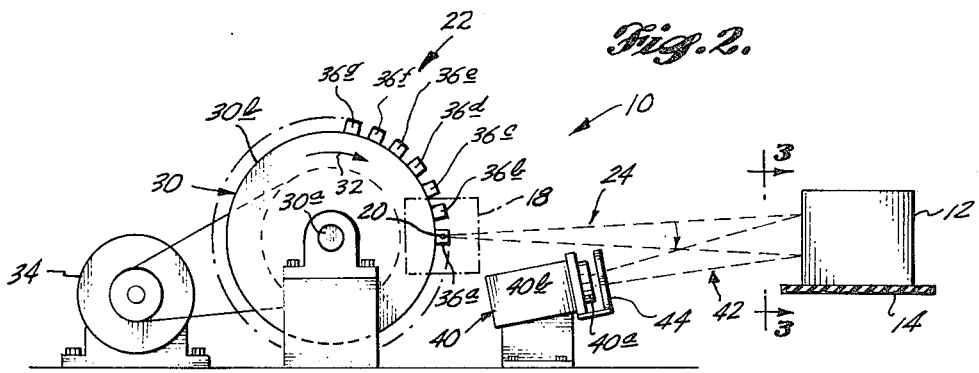
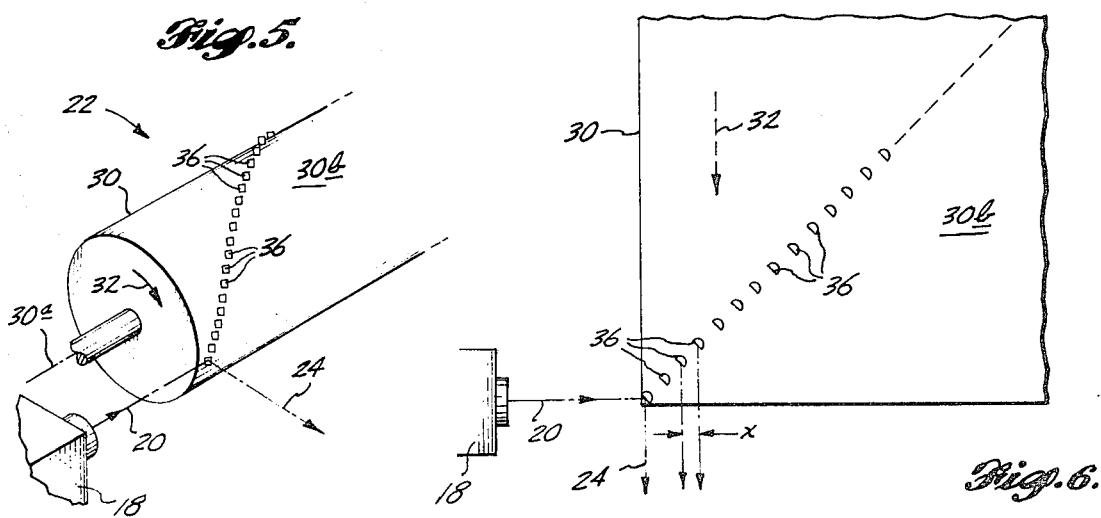

DIMENSIONAL MEASUREMENT OF REMOTE OBJECTS USING PROJECTED LIGHT RASTER

BACKGROUND OF THE INVENTION

The present invention relates generally to a method and apparatus for optically measuring physical objects, particularly objects which are remote or inaccessible for direct measurement. More specifically, the invention relates to the use of a projected light raster for measuring lineal dimensions of such objects.

There frequently is a need to measure stationary or moving objects in situations where, for various reasons, the use of mechanical measuring devices is undesirable, impractical or impossible. For example, it may be necessary to measure an object which is at a distance or otherwise inaccessible, or which is radioactive or at a high temperature. A number of different optical systems have been proposed for making measurements in such situations. According to one system, for example, the size of an object moving along a path through a measuring zone is determined by photoelectrically measuring the length or degree of obscuration of a light beam directed across the zone. In such a system, if the dimensional measurement is related to the degree of obscuration, changes in light source intensity or lateral movement of the object through the measuring zone may result in inaccurate determinations. According to another system, a grid of uniformly spaced, parallel light beams is projected simultaneously across a measuring space. A dimension of an object traveling through the space is measured by counting the number of beams which are not intercepted by the object, i.e., the number which pass by the object, and are detected by a photoelectric device on the opposite side. As in the earlier-described system, the light beam source and its photoelectric detection device must be disposed on opposite sides of the measured object's travel path. This requirement prevents the use of such systems in applications where access to only one side is available.

SUMMARY OF THE INVENTION

According to the present invention, apparatus is provided for projecting a set of time-separated pulses, or markers, of light along individual, parallel paths toward a corresponding set of uniformly spaced-apart points in a measuring zone. A dimension of a light reflecting object within the zone is determined from the number of markers it intercepts and reflects back. The apparatus of the invention suitably includes means for producing a narrow beam of light, and a plurality of reflectors, one for each marker in the set, mounted for movement through the beam one at a time, with each reflector intercepting the beam at the same angle but at a different distance from its source. Thus, as each reflector momentarily intercepts the beam, it projects a marker of light along a path at an angle to the beam toward a corresponding point in the measuring zone.

According to a preferred embodiment, such apparatus includes a collimated light beam source, and an elongate cylindrical body journaled for rotation about its longitudinal axis. A plurality of reflectors is mounted on the body at uniformly spaced-apart locations along a helical path concentric with its axis of rotation. The reflector-bearing body and the light source are suitably disposed whereby, upon rotation of the body, the reflectors swing through the beam one at a time, projecting a raster consisting of elongate light markers toward a remote measuring zone. A photodetection system is provided for counting the number of markers intercepted and reflected back by a stationary or moving object within the zone, and for indicating the count, from which the object's dimension is determined.

BRIEF DESCRIPTION OF THE DRAWINGS

The invention will now be described in greater detail, by reference to the accompanying drawings, wherein:

FIG. 1 is a schematic illustration of a measuring system according to a preferred embodiment of the invention;

FIG. 2 is a more detailed end view of the measuring system illustrated in FIG. 1;

FIGS. 5 and 6 schematically illustrate one form of light marker projection apparatus according to the invention.

DETAILED DESCRIPTION OF THE INVENTION

Turning now to the drawings, and first to FIG. 1, the present invention will be described by reference to an optical system for measuring articles, such as cartons, traveling on a conveyor. Thus, indicated generally at 10 is an optical measuring system for determining the length of cartons, such as a carton 12, carried by a conveyor 14 in the direction of arrow 16. System 10 includes a means or source, 18 for producing a narrow, collimated light beam 20. Source 18 suitable is a low power continuous wave laser, a 5 milliwatt helium-argon 6328 A laser, for example. The art skilled are well aware of other means for producing suitable light beams, however.

Figure 3:
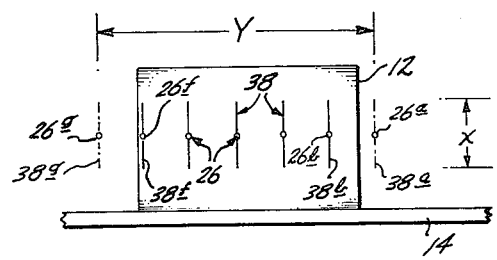
FIG. 3 is a fragmentary side view of the conveyor and measured object in FIG. 2, as viewed along line 3—3.

Referring now to FIGS. 2 and 3 along with FIG. 1, system 10 further includes light beam reflecting means 22 for sequentially deflecting beam 20 along multiple parallel paths 24 toward uniformly spaced-apart point 26 (FIG. 3) in a remote measuring zone 28 (FIG. 1). Means 22 comprises an elongate cylindrical body, or drum, 30 disposed with its longitudinal axis 30a parallel with and horizontally offset from beam 20. Drum 30 is journaled for rotation about axis 30a in the direction of arrow 32, powered by drive means, or motor, 34. A plurality of reflectors 36 is mounted on the drum's curved surface 30b at uniformly spaced-apart locations along a helical path concentric with axis 30a. For clarity in illustrating the invention, only seven such reflectors, designated 36a, 36b, . . . 36g, are shown in FIG. 1. A much larger number is typical, however, as will be explained later on.

As best shown in FIG. 2, reflectors 36 are mounted on drum 30 a radial distance from its axis 30a equal to the offset of the axis from beam 20. Each of the reflectors is inclined at the same angle, suitably 45°, with respect to axis 30a. Upon rotation of drum 30, reflectors 36 pass through beam 20 in succession, each one intercepting the beam a different distance from source 18. As each reflector momentarily intercepts and is impinged by beam 20, it deflects light from source 18 along a different path 24 normal to the beam toward a corresponding point 26 in measuring zone 28. Because, as will be understood, the reflectors travel along an arcuate path through beam 20, light from the source is deflected, or projected, in descending vertical sweeps along paths 24, as indicated in FIG. 2, with each sweep along a path producing an elongate vertical marker 38 (FIG. 3). Thus, with rotation of drum 30, reflectors 36a, 36b, . . . 36g move through beam 20 in succession, deflecting light from source 18 along corresponding parallel paths 24a, 24 b, . . . 24g toward uniformly spaced-apart points 26a, 26b, . . . 26g in zone 28 to provide a raster consisting of parallel projected light markers 38a, 38b, . . . 38g. As will be apparent from FIG. 2, the length of the markers in a raster increases with the distance they are projected. If desired, therefore, a suitable mask may be provided in paths 24 to limit the markers' projected length.

Referring now to FIGS. 1–4, optical measuring system 10 further includes a photodetector 40 for detecting light markers 38 intercepted and reflected back by an object, such as carton 12, in measuring zone 28, and for providing a correlative electrical output signal. As shown in FIGS. 1 and 2, the photodetector is located on the same side of conveyor 14 as reflecting means 22, the left side in the figures, disposed to view light reflected along paths 42 from cartons moving through a measuring zone. Photodetector 40 includes a wide angle lens 40a focused on a photosensitive device (not shown) inside an enclosure 40b. A suitable photosensitive device for detecting light at 6328 A is a United Detector Technology PIN-10 large area detector. The type of photodetector used is not considered critical. Knowing the wave length of light from source 18 and the minimum intensity of reflected light at the photodetector location, a suitable photodetector can easily be selected by one skilled in the art. If desired, a filter 44, such as a narrow passband interference filter, may be provided in the path of the reflected light markers to ensure that the photodetector responds only to light at the desired wavelength.

Referring to FIG. 1, photodetector 40 is operatively connected to indicator means 46, which may be a conventional electrical pulse counter. If desired, the indicator means may be adapted to give a direct reading of the dimension being measured as a function of the number of reflected light markers.

Figure 4:
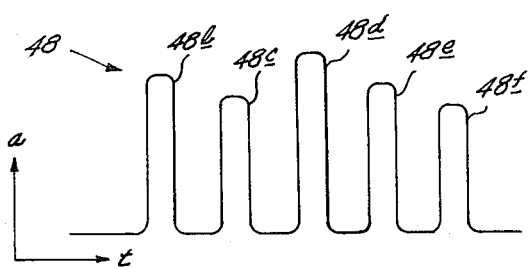
FIG. 4 is a diagram of representative electrical signals produced by the photodetector in FIG. 1.

Describing now the operation of system 10 in determining the length of cartons carried on conveyor 14, and referring particularly to FIGS. 1, 3 and 4, with motor 34 energized, reflectors 36a . . . 36g on rotating drum 30 pass through collimated light beam 20 in succession, intercepting the beam at uniformly spaced-apart points along a line parallel with the drum's longitudinal axis. As the beam impinges each reflector in turn, time-separated pulses of light forming elongate vertical markers 38a . . . 38g are projected in succession through a region overlying conveyor 14, along corresponding parallel paths 24a . . . 24g normal to the beam and to the conveyor. Markers 38 constitute a projected light raster which defines the limits of a measuring zone 28 through which the cartons are carried. Zone 28 has a height X equal to the length of markers 38, a length Y equal to the distance between end markers 38a and 38g, and, as will be appreciated, an indeterminate depth.

A carton moving through the measuring zone will intercept one or more of the markers in the projected raster, the number being independent on the length of the carton and its location within the zone. As shown in FIGS. 1 and 3, carton 12 intercepts five of the seven markers, including markers 38b through 38f, shown in solid line. Markers 38a and 38g, shown in phantom line, are not intercepted. Light from markers 38b . . . 38f is reflected along corresponding paths 42b . . . 42f to photodetector 40, which supplies a correlative output signal 48 (FIG. 4) to indicator means 46. As shown, signal 48 comprises a train of pulses 48b . . . 48f, one for each reflected marker. The number of pulses in counted and indicated by indicator means 46.

It will be noted that the pulses have different amplitudes (a), indicating variations in the reflected intensity of the markers. Such variations may be caused, for example, by source intensity variations, dust or other light scattering material in paths 24 or 42, or variations in the reflectivity of carton 12. However, as long as the detecting and counting means are sufficiently sensitive to count the weakest reflected light pulse, the measuring system is independent of reflected light intensity variations.

Knowing the distance between adjacent markers 38 in the projected raster, the length of carton 12 is determined as a function of the number of markers intercepted and subsequently detected and counted. For example, if adjacent light markers 38 are spaced one inch apart, the interception of five markers by carton 12 indicates that it is between 4 and 6 inches long.

As will be evident, the spacing between adjacent markers in a projected raster determines the precision of the resultant measurement, since the determination of a dimension by the disclosed method involves detecting and counting the number of markers reflected from the measured object. Thus, the maximum error in the determination of the dimension will be equal to twice the marker spacing. This assumes, of course, that the reflected markers are not counted until the object is entirely within the measuring zone, and that during the time required to project the markers forming a complete raster, any movement of the object along the measured dimension is less than the distance between adjacent markers. To satisfy the first-mentioned condition, means (not shown) may be provided for maintaining indicator means 46 in a noncounting condition until and unless an object being measured is fully within the measuring zone. To minimize or eliminate measurement error from object movement in the direction of the measured dimension, reflector-bearing drum 30 is rotated at a high rate of speed, suitably several thousand revolutions per minute. Because a complete raster is projected with each revolution of the drum, an object may be measured a number of times as it passes through the zone, depending on its rate of movement and the size of the zone, and the results averaged to improve measurement precision.

Now referring to FIGS. 5 and 6, according to one embodiment of the light marker projection apparatus of the invention, reflectors 36 are disposed on drum 30 at uniformly spaced-apart locations along a single turn helical path extending substantially the length of the drum. With rotation of the drum, the reflectors along the path intercept the beam in consecutive order. As should be evident, the spacing between adjacent markers in the projected light raster is determined by the axial distance ($x$) between adjacent reflectors along the path on the drum. Because of practical difficulties in mounting reflectors sufficiently close together on the drum, it is difficult to provide rasters of closely spaced markers with the arrangement shown in FIGS. 5 and 6. It will also be appreciated that the reflector-bearing drum shown in the figures is dynamically unbalanced, and vibration can be a problem at high rotational speeds, particularly in applications requiring wide measuring zones, and hence employing relatively long reflector-bearing drums.

Figure 7:
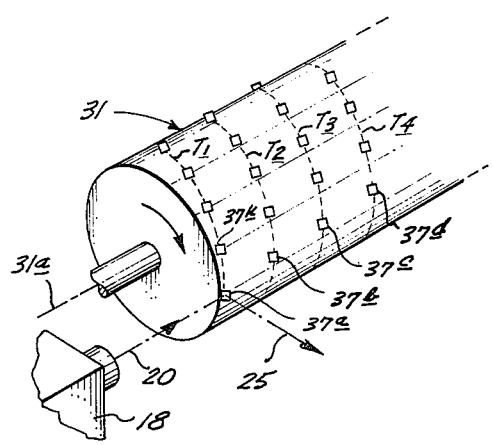
FIGS. 7 and 8 illustrate another form of light marker projection apparatus.
Figure 8:
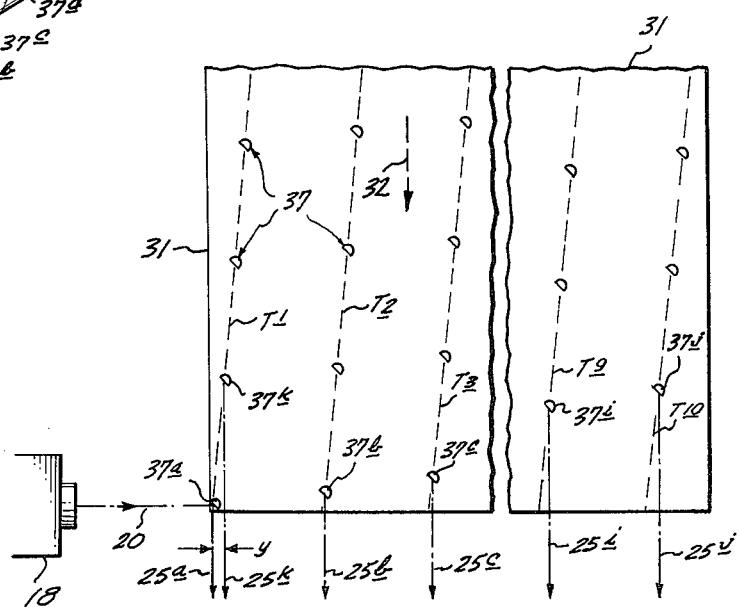

To overcome these drawbacks, the reflectors may be disposed along a multiple turn helical path in accordance with another embodiment of the invention, shown in FIGS. 7 and 8. According to this embodiment, a plurality of reflectors 37 is disposed at uniformly spaced-apart locations along a constant pitch, multiple turn helical path extending substantially the length of a drum 31. Upon rotation of the drum, the reflectors along the path intercept beam 20 in a nonsuccessive, staggered fashion. Thus, referring to FIG. 8, upon rotation of drum 31 in the direction of arrow 32, beam 20 is initially deflected along path 25a by reflector 37a in turn $T^1$. With continued rotation the beam is next intercepted and deflected along path 25b by reflector 37b in turn $T^2$, then along path 25c by reflector 37c in turn $T^3$, etc. Following deflection along path 25j by reflector 37j in path $T^{10}$, reflector 37k (turn $T^1$) intercepts the beam and deflects it along path 25k. Thus, it will be seen that adjacent markers in the resulting projected light raster will still be spaced apart the axial distance between successive reflectors along the path, the distance (y) between reflectors 37a and 37k. However, because of the much greater distance between adjacent reflectors on the drum, rasters of closely spaced markers may be provided without encountering the previously mentioned reflector mounting problems. In addition, the reflector arrangement of this embodiment provides excellent dynamic balance and permits the use of high drum rotational speeds.

The projected light raster measuring system disclosed herein provides a number of advantages. For example, by detecting only the number of light markers which are reflected back from an object in a remote measuring zone, a single-sided measuring system is provided, i.e., one in which all of the apparatus is located on one side of the measured object or its path of travel. This provides a relatively compact system which has added utility since it can be used in applications where the object to be measured is accessible from only one side. Because the markers are of collimated light and are projected along parallel paths, measurement accuracy is independent of the distance from the marker generator to the measured object, so long as the distance is not so great that divergence of the projected light causes excessive spreading of the markers and "blurring" of the raster, and so long as the intensity of any reflected marker is above the sensitivity threshold of the detector.

Although exemplary embodiments of the invention have been disclosed herein for purposes of illustration, it will be understood that various changes, modifications and variations are possible without departing from the spirit of the invention as defined by the claims which follow.

It is claimed and desired to secure by Letters Patent:

1. Apparatus for projecting markers of optical radiation along predetermined, multiple, parallel, generally coplanar paths, comprising
    source means for providing a beam of optical radiation,
    a plurality of spaced-apart reflectors for reflecting such a beam in a preselected direction along said predetermined paths, each reflector being located at a different respective distance from said source means, and
    rotary means operatively connected to said reflectors, operable with rotation on its axis to move the reflectors, one at a time, in a predetermined sequence along different arcuate paths which intersect said beam.

2. The apparatus of claim 1, wherein said rotary means comprises a cylindrical element journaled for rotation about its longitudinal axis, and wherein said reflectors are distributed along a helical path concentric with said axis.

3. The apparatus of claim 1, wherein said optical radiation source means comprises a substantially collimated, monochromatic light source.

4. The apparatus of claim 1, wherein said rotary means comprises a cylindrical element journaled for rotation about its longitudinal axis, and said reflectors are uniformly distributed along a single turn helical path on said element, whereby, with rotation of said element about said axis, the reflectors along the path consecutively intercept said beam.

5. The apparatus of claim 1, wherein said rotary means comprises a cylindrical element journaled for rotation about its longitudinal axis, and said reflectors are uniformly distributed along a multiple turn helical path on said element, each reflector being located at a different circumferential position with respect to said element, and being arranged whereby each interception of said beam by a reflector on one of the multiple turns along said path is followed by interception of the beam by a reflector on a different turn along said path.

6. Apparatus for projecting markers of optical radiation along predetermined, multiple, parallel, generally coplanar paths, comprising
    a source for producing a beam of such radiation which beams intersects said paths,
    a rotary element, and
    a plurality of spaced-apart reflectors mounted on said rotary element at different respective distances from said source for intercepting a beam produced by the same in a predetermined sequence with rotation of the element, said reflector being distributed along a single turn helical course defined on the outside of said element,
    said source, elements, and reflectors being so oriented relative to one another that rotation of the element causes different successive adjacent reflectors to move along arcuate paths which, in a predetermined time-spaced sequence, intersect said beam at the different points where said beam intersects said paths.

7. Apparatus for projecting markers of optical radiation along predetermined, multiple, parallel, generally coplanar paths, comprising
    a source for producing a beam of such radiation which beam intersects said paths,
    a rotary element, and
    a plurality of spaced-apart reflectors mounted on said rotary element at different respective distances from said source for intersecting a beam produced by the same in a predetermined sequence with rotation of the element, said reflectors being distributed along a multiple turn helical course defined on the outside of said element, with the reflectors being located at different respective circumferential positions respecting the element, said reflectors being arranged whereby each intersection of said beam by a reflector on one of the multiple turns along said course is followed by intersection of the beam by a reflector on a different turn along said course.

* * * * *